US 11,402,181 B2

(12) United States Patent
Jung et al.

(10) Patent No.: US 11,402,181 B2
(45) Date of Patent: Aug. 2, 2022

(54) WEAPONS SYSTEM HAVING AT LEAST TWO HEL EFFECTORS

(71) Applicant: RHEINMETALL WAFFE MUNITION GMBH, Unterluess (DE)

(72) Inventors: Markus Jung, Eicklingen (DE); Klaus Ludewigt, Hamburg (DE)

(73) Assignee: Rheinmetall Waffe Munition GmbH, Unterluess (DE)

( * ) Notice: Subject to any disclaimer, the term of this patent is extended or adjusted under 35 U.S.C. 154(b) by 432 days.

(21) Appl. No.: 16/563,319

(22) Filed: Sep. 6, 2019

(65) Prior Publication Data
US 2020/0003531 A1 Jan. 2, 2020

Related U.S. Application Data

(63) Continuation of application No. PCT/EP2018/052400, filed on Jan. 31, 2018.

(30) Foreign Application Priority Data

Mar. 6, 2017 (DE) ..................... 10 2017 104 662.3

(51) Int. Cl.
*H01S 3/00* (2006.01)
*F41H 13/00* (2006.01)
(Continued)

(52) U.S. Cl.
CPC ..... *F41H 13/0062* (2013.01); *H01S 3/08013* (2013.01); *H01S 3/0941* (2013.01); *H01S 3/094061* (2013.01); *H01S 3/101* (2013.01); *H01S 3/2308* (2013.01); *H01S 3/2383* (2013.01); *H01S 3/04* (2013.01)

(58) Field of Classification Search
None
See application file for complete search history.

(56) References Cited

U.S. PATENT DOCUMENTS 4,655,591 A 4/1987 Kriz
5,208,699 A 5/1993 Rockwell et al.
(Continued)

FOREIGN PATENT DOCUMENTS

DE 3318686 A1 11/1984
DE 202006010661 U1 2/2007
(Continued)

OTHER PUBLICATIONS

International Search Report dated Apr. 10, 2018 in corresponding application PCT/EP2018/052400.

*Primary Examiner* — Mark Hellner
(74) *Attorney, Agent, or Firm* — Muncy, Geissler, Olds & Lowe, P.C.

(57) ABSTRACT

A weapons system with at least two HEL effectors, which have at least one beam guidance system, the use of only one laser source or one pump source for the at least two HEL effectors is provided. The beam guidance systems of the HEL effectors resort to the common laser source or common pump source. An optical link of the common laser source or of the common pump source with the beam guidance system, be it direct or indirect, is implemented by means of at least one optical switching unit, and so at least one functional, complete HEL effector of the weapons system is provided to defend against threats.

8 Claims, 5 Drawing Sheets

(51) Int. Cl.
 *H01S 3/08* (2006.01)
 *H01S 3/094* (2006.01)
 *H01S 3/0941* (2006.01)
 *H01S 3/101* (2006.01)
 *H01S 3/23* (2006.01)
 *H01S 3/04* (2006.01)

(56) References Cited

U.S. PATENT DOCUMENTS

| | | | |
|---|---|---|---|
| 6,219,360 B1 | 4/2001 | Komine | |
| 6,404,784 B2 | 6/2002 | Komine | |
| 7,342,651 B1 | 3/2008 | Woolfson | |
| 7,405,834 B1 * | 7/2008 | Marron | G01S 7/4812 356/521 |
| 8,272,157 B2 | 9/2012 | Nachshon | |
| 8,575,528 B1 | 11/2013 | Barchers | |
| 8,941,910 B2 | 1/2015 | Hagen | |
| 10,020,632 B2 | 7/2018 | Courjaud | |
| 10,180,492 B2 | 1/2019 | Protz | |
| 10,337,841 B2 | 7/2019 | Segev et al. | |
| 2003/0043058 A1 * | 3/2003 | Jamieson | G01S 17/933 340/961 |
| 2005/0065668 A1 | 3/2005 | Sanghera et al. | |
| 2005/0201429 A1 * | 9/2005 | Rice | H01S 3/06758 372/27 |
| 2010/0126335 A1 | 5/2010 | Saban et al. | |
| 2010/0254154 A1 | 10/2010 | Fine et al. | |
| 2014/0153593 A1 | 6/2014 | Nishikata et al. | |
| 2015/0043597 A1 | 2/2015 | Yusim et al. | |
| 2015/0029321 A1 | 10/2015 | Protz | |
| 2017/0234658 A1 * | 8/2017 | Segev | F41H 13/0062 250/203.2 |

FOREIGN PATENT DOCUMENTS

| | | | |
|---|---|---|---|
| DE | 102010051097 A1 | 5/2012 | |
| DE | 102012015074 B3 | 12/2013 | |
| DE | 102012022039 A1 | 5/2014 | |
| FR | 2864217 A1 * | 6/2005 | F42B 3/113 |
| FR | 3023423 A1 | 1/2016 | |
| JP | H11340555 A | 12/1999 | |
| JP | 2013134887 A | 7/2013 | |
| JP | 2014109413 A | 6/2014 | |
| WO | WO2006103655 A2 | 10/2006 | |
| WO | WO2016024265 A1 | 2/2016 | |

* cited by examiner

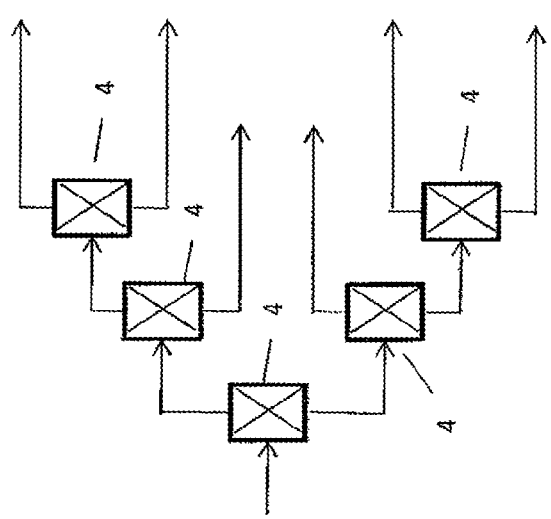

WEAPONS SYSTEM HAVING AT LEAST TWO HEL EFFECTORS

This nonprovisional application is a continuation of International Application No. PCT/EP2018/052400, which was filed on Jan. 31, 2018, and which claims priority to German Patent Application No. 10 2017 104 662.3, which was filed in Germany on Mar. 6, 2017, and which are both herein incorporated by reference.

BACKGROUND OF THE INVENTION

Field of the Invention

The present invention relates to a weapons system comprising at least two high-energy laser (HEL) effectors (HEL=High Energy Laser). The invention concerns the system structure of a weapons system with a plurality of, but at least two, HEL effectors on an object, in particular with regard to the aspects of system weight, volume, integration concept and installation effort.

Description of the Background Art

Inter alia, HEL effectors are used to protect movable or stationary objects. A HEL effector is used to combat different targets. Multiple HEL effectors can be targeted at one target or multiple targets at the same time. This can include static targets such as mines, IEDs (Improvised Explosive Devices), etc., but also dynamic targets, such as rockets, artillery shells or RAM projectiles, etc. These targets are then demolished and/or destroyed as part of the defense against the threat. Small targets (Low, Slow & Small=LSS targets) in particular can be more easily demolished or destroyed by such a weapons system. LSS targets also include so-called UAVs (Unmanned Air Vehicles), such as drones, which are often used improperly for transporting explosives.

Key components of a HEL effector include a laser source and a beam guidance system. The beam guidance system can house the sub-assemblies fine imaging system (FIS), fine tracking system (FTS), telescope and, if necessary, at least one adaptive optical system (AO). Well-known laser sources are gas lasers, such as $CO_2$ lasers, as well as solid state lasers, such as diode lasers, fiber lasers, etc.

Currently, fiber lasers, a special form of diode-pumped solid state laser, are preferred as laser sources for HEL effectors because of their advantages. The high-performance fiber laser includes one or more pump sources, such as one or more pump diodes. In the fiber laser, the pumping light is coupled into an active fiber and converted into laser light of very good beam quality. High-performance fiber lasers are either constructed as pure oscillators (an active fiber with a resonator) or as multi-stage oscillator-amplifier systems so-called MOPA (Master Oscillator and Power Amplifier). In a MOPA structure, the power of an oscillator is coupled into subsequent amplifier levels (active fibers) and boosted to higher power. The laser light is then emitted via the beam guidance system to a target etc. to attack the target. All optical components are usually connected to optical fibers (passive transport fibers). In addition, there are the power supply and cooling system, which supply and cool the pump source and the master oscillator power amplifier of the individual laser sources. The power supply and cooling system can be part of the laser source.

Due to non-linear processes that can occur in fibers at high power levels, the lengths of the ready-made fibers must be limited, for example between the MOPA or oscillator and the beam guidance system at high power levels in the multi-kW range. Depending on the power, fiber parameters, fiber structure, wavelength, etc., a maximum possible fiber length of a few meters can result.

The M2 beam quality is also a decisive factor for the effect of HEL effectors. The beam quality value M2 should be as low as possible, preferably less than 2.

HEL effectors, like other weapons systems, can be lafetted on a fixed or movable platform. Weapons stations are also referred to as a platform. Said platforms, for their part, can be attached to stationary objects (e.g. houses, bunkers, containers, etc.) or moving objects (e.g. vehicles on land, in the air and at sea, containers, etc.). For larger objects, multiple platforms are often used. On a vehicle, especially on a maritime object, such as a ship, the platforms are often disposed on the starboard and/or port side. Other platforms may additionally or alternatively be mounted on the bow and/or on the stern.

The advantage of a HEL effector over conventional effectors (conventional weapons) is, among other things, a high hit accuracy and a delay-free effect. There is no need to take any prediction into account. There are also no muzzle flashes and almost no firing signatures. Similarly, there is no limit on the operational capability of the HEL effector due to a magazine capacity.

In order to achieve the required radiation quality of a HEL effector, the aim is also to accommodate the MOPA or the oscillator very close to the weapon station or platform.

The components of the HEL effector are housed in practice in a compartment (chamber). This leads to the restriction of deployment locations and the feasible maximum laser power. Such a restriction has a negative effect on maritime objects in particular.

A laser system for generating high or compact power densities on the object is known from DE 10 2010 051 097 A1. The power is divided between several lasers or laser weapons and geometrically superimposed on the target, so that a total power density of all the individual power densities is achieved in total. As a weapon, the single lasers or laser weapons form a weapons system to combat an attacking object. Said laser weapons are aimed at the object by means of coarse tracking and fine tracking. The laser weapons can be mounted on a moving or stationary platform. According to the document, such lasers can also be used as processing lasers for material processing, for example at greater distances.

WO 2006/103655 A2, which corresponds to U.S. Pat. No. 8,272,157, describes a laser or laser weapon in which a laser generation unit is positionally separated from a telescope that is to be directed at the target. While the telescope, together with a target detection or tracking arrangement, is located on a mobile platform of a mobile vehicle, the laser generation unit is fixedly integrated within the mobile vehicle or a separate unit. The functional connection between the telescope and the laser generation unit is made by means of an optical fiber.

DE 33 18 686 A1, which correspond to U.S. Pat. No. 4,655,591, discloses a device for aiming a laser beam. This device is designed to be able to pivot a high-energy laser beam in a fixed parallel orientation with the orientation of other devices on a platform. The laser source is disposed away from the platform. The laser beam is transmitted to optical elements via deflection mirrors.

DE 10 2012 015 074 B3, which corresponds to U.S. Pat. No. 8,941,910, discloses a beam directing unit for a laser weapons system, wherein the beam directing unit comprises a stationary/partly movable component and a fully movable component. A target acquisition or target tracking device as well as a telescope and an output stage element are attached to the fully movable part. The beam directing unit includes at least one laser generation unit, which comprises at least one seed laser unit and at least one pump laser unit. The seed laser unit as well as the pump laser unit are connected to the output stage element (e.g. an amplifier) using an optical fiber. In the case of several pump laser units, the individual laser powers are merged in a beam coupler and also fed to the output stage element via an optical fiber. This ensures that the mass on the fully movable part can be reduced. The total weight on the object, on the other hand, does not change.

SUMMARY OF THE INVENTION

It is therefore an object of the present invention to optimize the system design in terms of the required mass, space requirements and integration effort when using two or more HEL effectors.

The invention is based on the idea of not assigning all the key components of a HEL effector to every HEL effector. For example, not every HEL effector should have its own complete laser source, or parts thereof. Rather, it is envisaged that this key component, or parts thereof, will be jointly usable by several HEL effectors. This key component, or parts thereof, is/are defined as a shared component. In an optimal implementation, a HEL effector only needs its own key component, namely at least one beam guidance system as an individual component. The individual beam guidance systems may house the sub-assemblies of fine imaging systems (FIS), fine tracking systems (FTS), telescopes and, if necessary, at least one adaptive optical system (AO). The jointly usable key component, or parts thereof, is/are in turn connected to the individual key component(s) of the HEL effector in such a way that the operation of at least one HEL effector is guaranteed.

The present invention therefore proposes to use only one laser source or pump source for at least two HEL effectors in a weapons system with at least two HEL effectors, which have at least one beam guidance system. The beam guidance systems of the HEL effectors access the common laser source or pump source. An optical connection of the common laser source or pumped source to the beam guides, directly or indirectly, is made by at least one optical switching unit, so that at least one functional, complete HEL effector is provided in the threat response weapons system.

As a consequence of this idea, individual key components, or parts thereof, can be saved in the case of a plurality of HEL effectors on an object. By saving individual key components, or parts thereof, the total weight, space requirement and integration effort of the HEL effectors on the object can be reduced.

This idea is based on the knowledge that the accuracy, precision and fast alignment of today's HEL effectors make it possible to combat a target or even multiple targets by a single HEL effector. There is no need for all the HEL effectors attached to the object to be functional at the same time.

In an exemplary embodiment, a plurality of HEL effectors, at least two, formed of a jointly usable key component, the laser source, and an individual key component, the dedicated beam guidance system. The laser source includes at least one pump source with at least one pump diode, preferably a plurality of pump diodes, as well as at least one MOPA, alternatively at least one oscillator. A power supply and cooling system can also be assigned to the laser source.

The central laser source is the key component of all HEL effectors. The optical connections are realized using optical fibers or free space. The laser source, which can be used by several HEL effectors, can in turn be placed centrally on the object. It should be noted that a necessary beam quality is maintained during beam transport.

An optical connection of the central laser source to the individual beam guidance systems is carried out via at least one optical switching unit. The optical switching unit can be an optical switch or an optical switching point. An optical switching point is characterized in that it switches quickly, with angular precision and always reliably. The optical switching unit should also be designed to be able to divide the laser light between at least two outputs of the optical switching unit, even at the same time. The distribution should be achievable continuously or in several stages. There are at least two stages to be provided, for example via end stops. The laser light should be able to be divided from 0 to 100%.

The single HEL effector thus includes in a first embodiment of a jointly usable laser source and at least one dedicated beam guidance system. This creates the possibility that only the individual beam guidance system of the respective HEL effector needs to be lafetted on a platform as already defined. This possible implementation is not favored, but it is technically feasible.

In continuation of the invention, in a further, preferred implementation the entire laser source, i.e. with all components, such as pump source, MOPA or oscillator, is disposed centrally. It can be sufficient if only the pump source(s) of the laser source is/are centralized. In addition to the dedicated beam guidance system, a dedicated master oscillator+ amplifier (MOPA) or oscillator is assigned to each HEL effector. Said MOPA or oscillator can then be disposed in the vicinity of, even in close proximity to, the respective platform, but can even be mounted on the respective platform. Each amplifier of the MOPA or oscillator can be optically connected to the pump source. The master oscillator (MO) can be accommodated in the vicinity of the pump source or the amplifier depending on the length of the fiber. Other amplifiers may also be integrated upstream of the individual beam guidance systems of the HEL effectors.

The optical switching unit, for its part, serves to apportion the pumping power of the pump source to at least two outputs of the optical switching unit. For a plurality of pump sources, these can also be distributed via the optical switching unit to at least two outputs of the optical switching unit. The outputs of the optical switching unit(s) for pumping power are in turn associated with at least one input of the amplifiers (PA) of the HEL effectors, preferably by means of optical fibers. The division of pumping power should be carried out continuously or in multiple stages. In this case, at least two stages are to be provided, for example via end stops. The pump power should be able to be split from 0 to 100%. It is also provided that the division is possible at the same time for a plurality of outputs of the optical switching unit. A simultaneous division of pump power between the amplifiers (PA) of the HEL effectors allows several HEL effectors to be able to function at the same time.

Alternatively, each pump source can be fed to the dedicated optical switching unit thereof and apportioned thereby to at least two outputs. Furthermore, a cascaded arrangement of $2n$ outputs can be realized with the help of a plurality of optical switching units comprising at least two outputs.

In this second implementation, the individual HEL effector are formed of a jointly usable central pump source, as well as at least one dedicated MOPA or at least one dedicated oscillator and at least one dedicated beam guidance system. The respective MOPA or oscillator of the HEL effectors can be accommodated near the beam guidance system of the HEL effector. A direct connection to the platform together with the beam guidance system is also conceivable.

The optical connection between the pump source and the amplifiers of the MOPA or the oscillators is preferably established via optical fibers. A free space version is also possible.

The optical connection of the central pump source to the oscillators or the amplifiers of the MOPA is established here too via at least one optical switching unit. The optical switching unit can also be an optical switch or an optical switching point. By means of the optical switching unit, a working line can result in this embodiment: pumping unit—fiber (optical path)—optical switching unit—fiber (optical path)—oscillator or amplifier. When using a plurality of oscillators, the outputs of the optical switching point(s) are connected to a pump input (active medium) of the oscillator, preferably by means of optical fibers. Even with a low beam quality of the pump diodes, despite the high power, an optical connection (fiber, free space) with a significantly greater distance than a few meters can be established between the at least one optical switch and the amplifiers or oscillators. However, variations that lack an optical path are also conceivable in this embodiment.

Another option is to provide a commonly usable master oscillator (MO) separately from the pump source instead of the many individual master oscillators. The optical connections between the pump source and the amplifiers of the HEL effectors are implemented according to the second embodiment. The central master oscillator provided can be located near the pump source, which simplifies the power supply and cooling of the master oscillator. The output of the master oscillator can be switched to at least one input of the amplifiers (PA) of the HEL effectors by means of at least one further optical switching unit.

Due to the low weight of the individual amplifier, it can be lafetted directly on the platform with the beam guidance system. This allows the good beam quality of the amplifier to be coupled into the beam guidance system at high power. Depending on the output power of the master oscillator, different permissible fiber lengths result for the optical connection, e.g. optical fiber, between the master oscillator and the amplifiers.

The individual HEL effector formed in this third, also favored version of a jointly usable central pump source, a shared master oscillator (MO), dedicated amplifiers (PA) as well as dedicated beam guidance systems.

An additional controller can also be used to determine which of the MOPA, amplifier (PA) or oscillator(s) to be added should be supplied with what percentage of laser or pumping power. Thus, for each HEL effector, the beam power of the laser or pump source can be adjusted and/or varied. Said percentage portion can be controlled by means of the optical switching unit(s).

The optical switching units, for their part, can be spaced apart from the central laser source or the central pump source and, if necessary, from the central master oscillator (MO). Due to the low beam quality of the pump diodes, an optical connection (fiber, free space) with a significantly longer distance than a few meters can be implemented here, especially between the optical switching units and the amplifiers or oscillators. With poorer beam quality, the beam transport takes place in fibers with a larger core diameter at a reduced intensity, so that non-linear processes are used to a reduced extent.

The optical switching unit also allows the laser source or pump source to be separated from the other components of the HEL effectors. The HEL effectors can be changed to a safety state by means of the optical switching unit(s).

Of course, other central laser sources, pump sources and other central master oscillators, etc. can also be provided as jointly usable key components. This makes it possible to create a redundant system. Also, multiple HEL effectors can be grouped together into groups that can then be operated in parallel.

The use of a laser source, alternatively a pump source, etc., for a plurality of HEL effectors allows the total weight on the object to be reduced. The decentralized arrangement of the common central laser source or pump source etc. for the plurality of HEL effectors also creates the possibility of placing them on or in the object and protected from environmental influences.

In addition to the weight saving, the present invention gives a further advantage. The laser source, pump source, possibly the central master oscillator power amplifier (MOPA) or the central master oscillator (MO) or central oscillator can now preferably be accommodated within the object, e.g. in the hull of a ship or vehicle. These components are no longer subject to the environmental requirements on the object. A positional separation also gives another advantage. In this way, the individual components can be installed in smaller spaces on the object, for example in recesses.

Especially on a ship, saving components is a huge win. Such scaling down of components makes the use of HEL effectors on such objects possible and also financially practicable. The HEL effectors can be offered more cost-effectively. Existing platforms, such as conventional effectors, can also be used. For example, the platform of a naval light gun, etc., can be used to accommodate individual components of the HEL effectors. However, these advantages also arise for other vehicles on land, sea and in the air and can be transferred to other objects.

The mode of operation is generalized as follows:

If a target or threat is detected, for example by means of a weapon delivery system, it is determined which of the beam guidance system(s) of the HEL effectors on the object can provide the best possible defense against or neutralization of the threat as quickly as possible. Such procedures are known to the person skilled in the art. The weapon delivery system then decides which beam guidance system(s) to use. Alternatively, this can be carried out by an operator. As a result of this decision, an optical linking of the selected beam guidance system(s) is carried out as described above. The switching of the optical switching unit(s) can be carried out pneumatically, hydraulically as well as electrically or electro-optically, although other possibilities are not excluded. The switching is controlled by the central control unit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5 shows a sketched representation of a cascade structure for a division of laser power.

DETAILED DESCRIPTION

Figure 1:
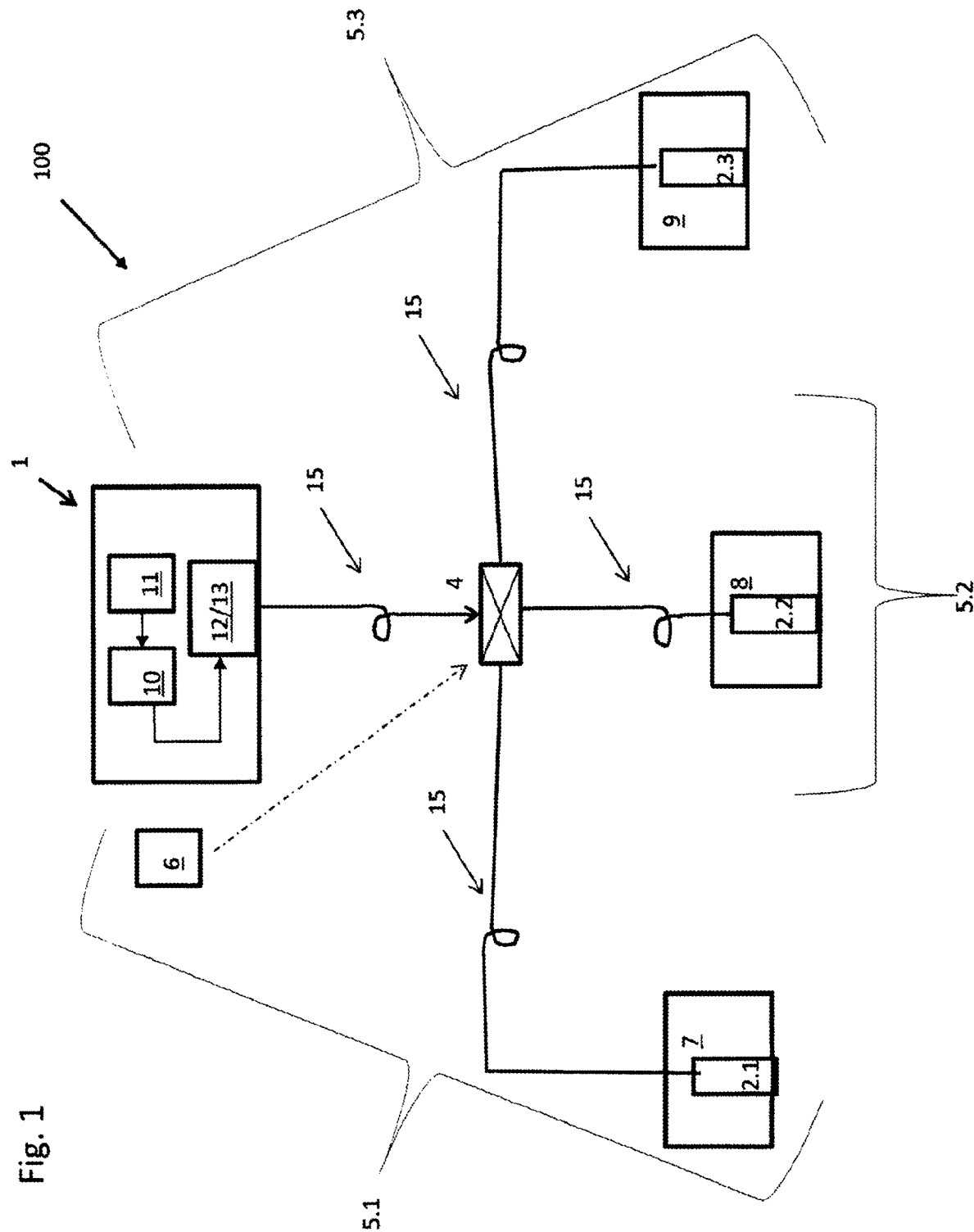
FIG. 1 shows an exemplary embodiment of the inventive idea in a schematic block image representation, wherein a laser source can be used for at least two or more HEL effectors.

In FIG. 1 a laser source 1 as well as at least two beam guidance systems 2.1, 2.2, 2.3 are represented as key components of several, at least two, HEL effectors 5.1, 5.2, 5.3.

An imaging system is defined as the beam guidance system 2.1, 2.2, 2.3. This can be built according to DE 10 2010 051 097 A1, which is incorporated herein by reference. Beam guidance systems with a different structure are also conceivable. The laser source 1 contains at least one pump source 10, which is formed by at least one pump diode. The pump source 10 can be supplied with electricity and cooled by a power supply and cooling system 11. Said power supply and cooling system 11 can be a component of the laser source 1. Associated with the laser source 1 is a master oscillator power amplifier (MOPA) 12 (e.g. a seed laser+ amplifier), which can be placed therein. Alternatively, an oscillator (single resonator) 13 can be used.

The individual beam guidance systems 2.1, 2.2, 2.3 of the HEL effectors 5.1, 5.2, 5.3 can be connected by means of an optical switching unit 4 to the laser source 1. HEL effectors 5.1, 5.2, 5.3 thus have a common laser source 1 and individual beam guidance systems 2.1, 2.2, 2.3 as their key components.

The optical switching unit 4 can be an optical switch or an optical switching point. The optical switching unit comprises at least one input and at least two outputs. The optical switching unit 4 should be designed to be able to split the laser power (optical power) generated in the laser source 1 for the beam guides 2.1, 2.2, 2.3 of the HEL effectors 5.1, 5.2, 5.3. The division can be carried out continuously or in multiple stages. The optical power can be divided between 0% and 100%. It is also provided that it is possible to split the optical power at the same time, so that a plurality of beam guides 2.1, 2.2, 2.3 of the optical switching unit 4 can be supplied with optical power at the same time. For example, if the optical switching unit 4 comprises only two outputs, several optical switching units 4 can be used to build a cascade, by means of which a division of the laser power between the beam guides 2.1, 2.2, 2.3 can be realized (FIG. 5).

The output of the laser source 1 is optically (15) connected to an input of the optical switching unit 4, ideally by an optical fiber. A free space link is also possible.

The multiple outputs of the optical switching unit 4 are fed to the inputs of the beam guidance systems 2.1, 2.2, 2.3 by means of optical connections 15. The switching of the optical switching unit 4 is controlled by an additional controller 6.

The beam guidance systems 2.1, 2.2, 2.3 can in turn be lafetted on a platform 7, 8, 9. The platforms 7, 8, 9, for their part, are preferably movable, so that the beam guidance systems 2.1, 2.2, 2.3 of the HEL effectors 5.1, 5.2, 5.3 can be pivoted in azimuth and/or elevation. This allows the HEL effectors 5.1, 5.2, 5.3 to be aimed at the threat(s).

The HEL effectors 5.1, 5.2, 5.3 are formed in a first embodiment by the common central laser source 1, the optical switching unit 4, the dedicated beam guidance systems 2.1, 2.2, 2.3 as well as the optical connections 15, ideally optical fibers.

A plurality of HEL effectors 5.1, 5.2, 5.3 can be combined into a weapons system 100.

The manner of operation is as follows:

After a threat or threats has/have been detected in a conventional way, it is determined by a weapon delivery system, e.g. a fire control system, which beam guidance system 2.1, 2.2, 2.3 would achieve a good defense against the threat. In the event that the beam guidance system 2.1 of the HEL effector 5.1 is determined, this information is given to the controller 6. The controller 6 in turn switches the optical switching unit 4 so that the optical power of the laser source 1 is transmitted via the switched output of the optical switching unit 4 and the input of the selected beam guidance system 2.1. Said beam guidance system 2.1 radiates the optical power against the threat.

The optical power of the laser source 1 can also be output to the beam guidance system 2.1 to a reduced extent by the optical switching unit 4 (reduced to less than 100%). Should the fire control system stipulate that more than one beam guidance system 2.1, 2.2, 2.3 is used for defense, the optical power of the laser source 1 will be split and this optical power will be divided between the inputs of the beam guidance systems 2.1, 2.2, 2.3 designated or defined for the defense. From these, the optical power can then be radiated to avert the threat against it. In doing so, beam guidance systems 2.1, 2.2, 2.3 can be jointly aimed at one threat, as well as at different threats.

Figure 2:
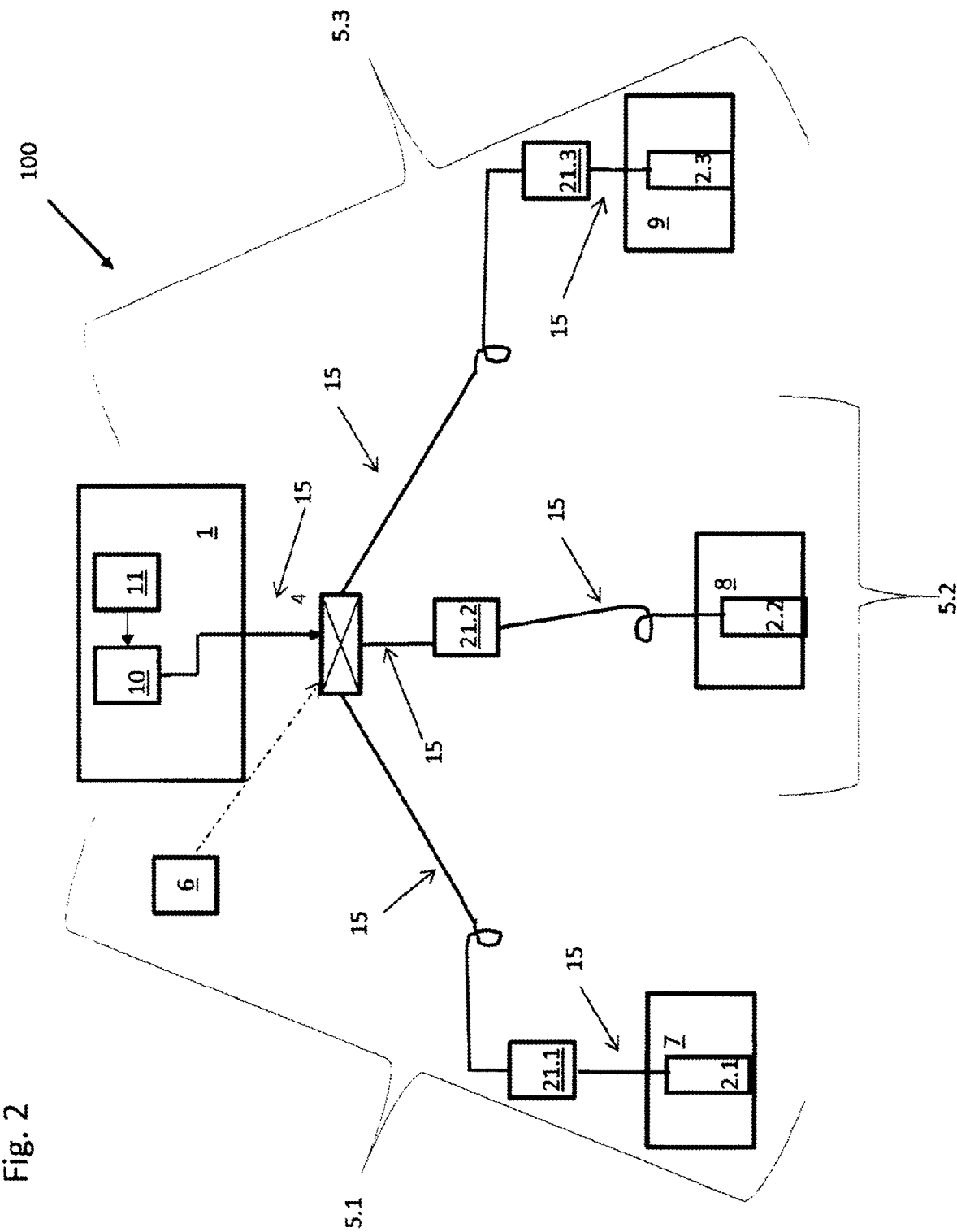
FIG. 2 shows an exemplary embodiment of the inventive idea in a schematic block image representation, wherein at least one pump source is used for at least two or more HEL effectors.
Figure 3:
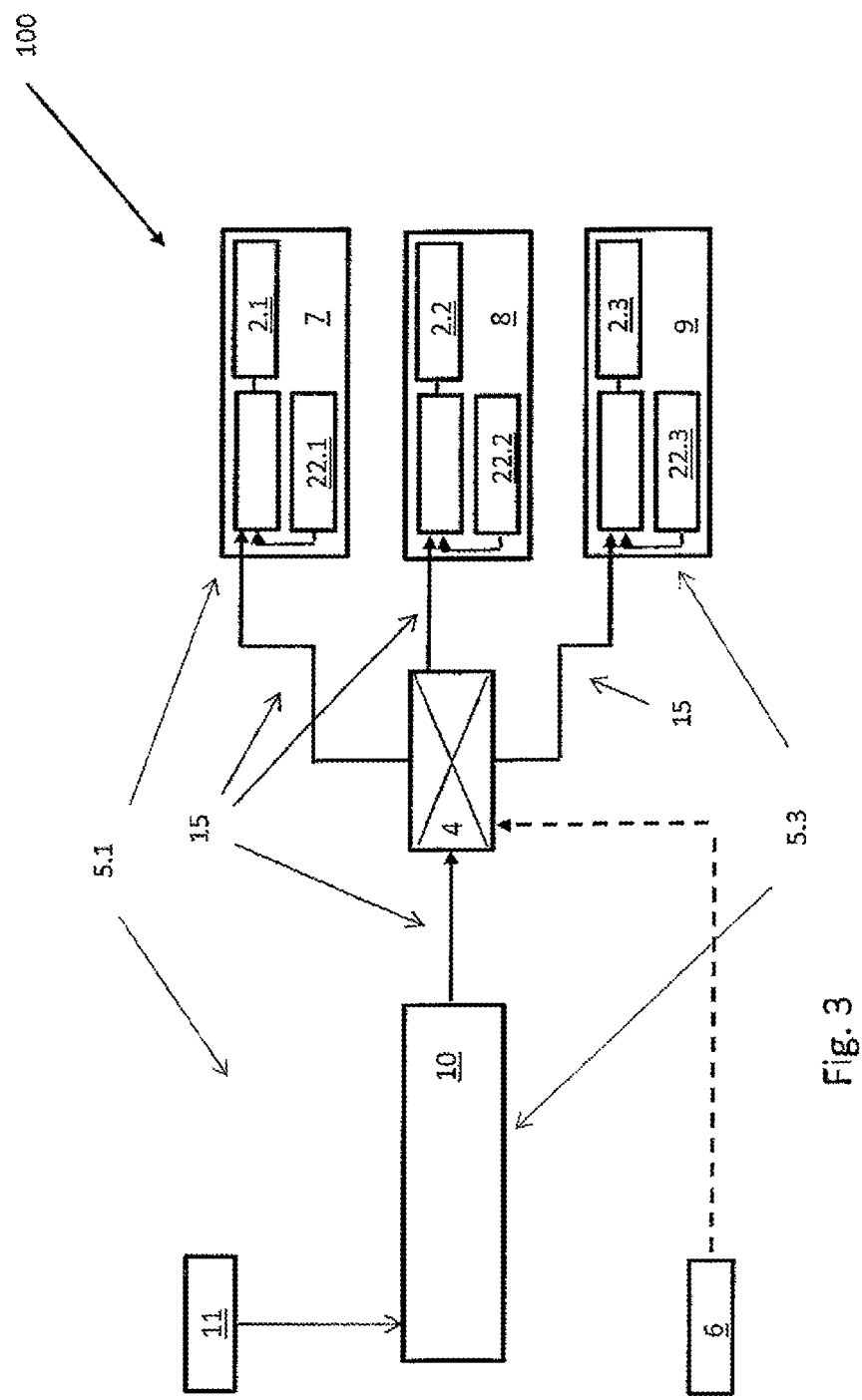
FIG. 3 shows an exemplary embodiment similar to FIG. 2.

FIG. 2 and FIG. 3 show a variant of the solution according to FIG. 1 as a second exemplary embodiment. Unlike the solution according to FIG. 1, in the second exemplary embodiment the MOPA 12 or oscillator 13 is removed from laser source 1. A central pump source 10 is provided that generates the required pumping power for all the HEL effectors 5.1, 5.2, 5.3.

According to FIG. 2 instead of a central oscillator 13 a plurality of oscillators 21.1, 21.2, 21.3 are provided for the HEL effectors 5.1, 5.2, 5.3. An output of the respective oscillator 21.1, 21.2, 21.3 is fed to the associated beam guidance system 2.1, 2.2, 2.3. The optical switching unit 4 provides the oscillators 21.1, 21.2, 21.3 with pumping power of the pump source 10. The optical switching unit 4 is switched as described for FIG. 1.

The MOPA 12 can also be divided into multiple MOPAs 22.1, 22.2, 22.3 (FIG. 3). Said MOPAs 22.1, 22.2, 22.3 can be arranged near platforms 7, 8, 9. An output of the amplifier of the MOPA 22.1, 22.2, 22.3 is directed to the associated beam guidance system 2.1, 2.2, 2.3. The supply of pumping power of the pump source 10 to the amplifiers of the MOPAs 22.1, 22.2, 22.3 is carried out by means of the optical switching unit 4. The manner of operation and the switching of the optical switching unit 4 are carried out as described for FIG. 1.

The HEL effectors 5.1, 5.2, 5.3 are formed in these embodiments by a common pump source 10 (plus a power supply and cooling device 11), an optical switching unit 4, oscillators 21.1, 21.2, 21.3 and MOPAs 22.1, 22.2, 22.3 and their dedicated beam guides 2.1, 2.2, 2.3 as well as the optical connections 15, ideally optical fibers.

Figure 4:
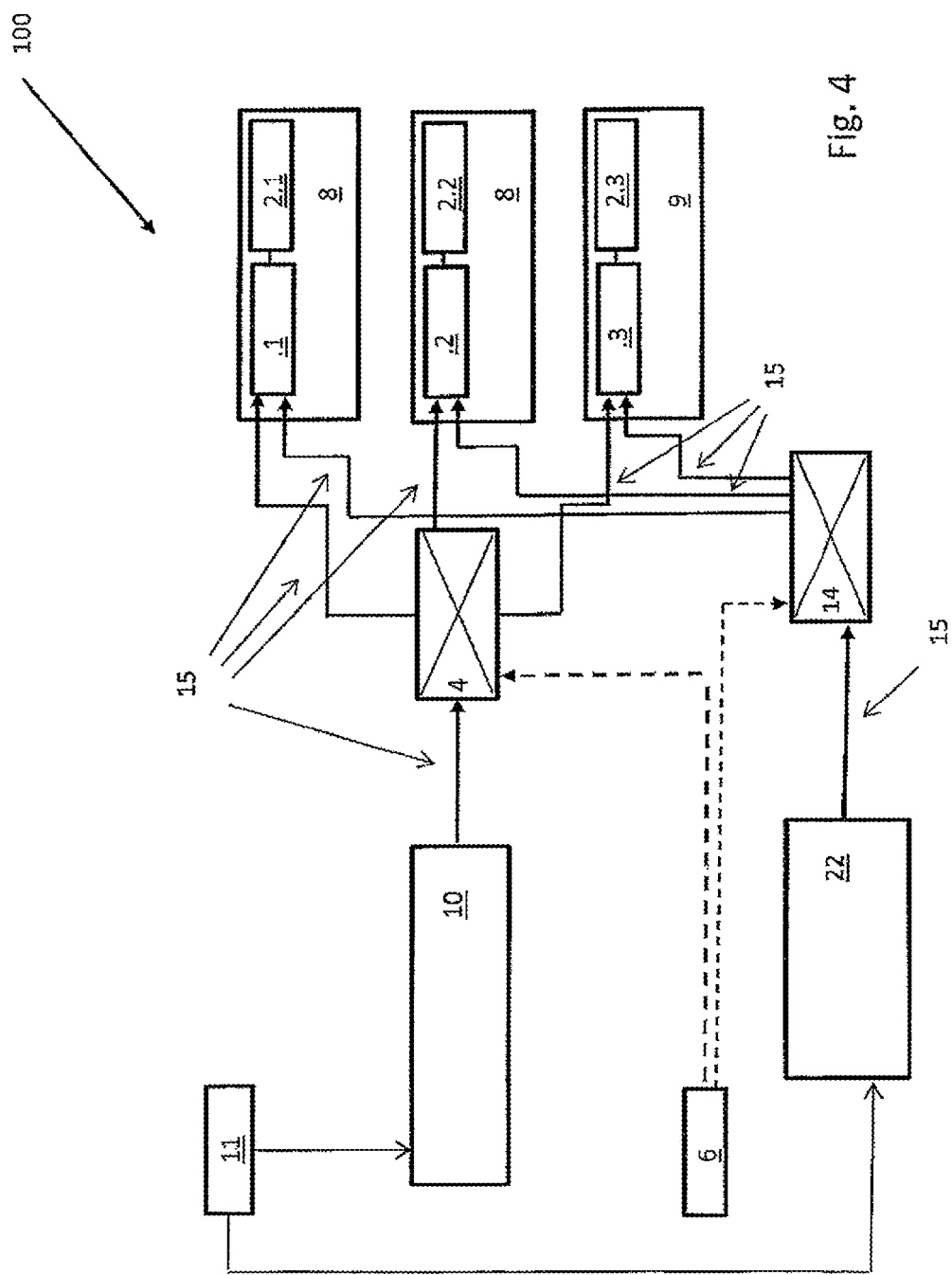
FIG. 4 shows an exemplary embodiment of the inventive idea in a schematic block image representation.

FIG. 4 shows another solution variant of the inventive idea, based on FIG. 3. The exemplary embodiment according to FIG. 3 shows the variant according to which the entire MOPA 22.2, 22.3 can be mounted separately from the pump source 10 close to the pump source 10 or the beam guidance systems 2.1, 2.2, 2.3.

Accordingly FIG. 4 is now a further step in the implementation of the idea in that said MOPAs 22.1, 22.2, 22.3 are implemented in such a way that a common master oscillator (MO) 22 can be provided for the remaining amplifiers 0.1, 0.2, 0.3. This in particular minimizes the weight to be lafetted, since only the respective amplifier 0.1, 0.2, 0.3 would have to be lafetted.

For this embodiment, another optical switching unit 14 is used, which, like the optical switching unit 4 for pumping power, can also connect the central master oscillator 22 to the individual amplifiers 0.1, 0.2, 0.3 at the same time. Said optical switching unit 14 should be able to meet the same requirements as the optical switching unit 4. The optical switching unit 14 is located between the output of the master oscillator 22 and an input of the amplifiers 0.1, 0.2, 0.3 for this and switches the output of the master oscillator 22 to the respective input of the amplifiers 0.1, 0.2, 0.3. Another input of the amplifiers 0.1, 0.2, 0.3 is reserved for supplying the pumping power of the pump source 10.

The HEL effectors 5.1, 5.2, 5.3 in this fourth version are provided by a central pump source 10, a central master oscillator (MO) 22, the individual dedicated amplifier(s) 0.1, 0.2, 0.3, which are aligned with the dedicated beam guidance system 2.1, 2.2, 2.3, as well as the optical connections 15, ideally optical fibers.

It is understood that within the scope of the inventive idea, more than one weapons system 100 will also be attached to the object, e.g. a port weapons system or a starboard weapons system, etc.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A weapons system comprising:
at least two HEL effectors, each of the at least two HEL effectors comprising at least one beam guidance system; and
at least one laser source or pump source that is jointly useable for the at least two HEL effectors,
wherein each of the at least two HEL effectors have a respective oscillator associated thereto, and wherein the at least one laser source or pump source is connected to the at least one beam guidance system of each of the at least two HEL effectors via at least one optical switching unit disposed between an output of the at least one laser source or pump source and an input of the oscillator associated with each respective one of the at least two HEL effectors.

2. A weapons system comprising:
at least two HEL effectors, each of the at least two HEL effectors comprising at least one beam guidance system; and
at least one laser source or pump source that is jointly useable for the at least two HEL effectors,
wherein each of the at least two HEL effectors comprises a MOPA, and wherein the at least one laser source or pump source is connected to the at least one beam guidance system of each of the at least two HEL effectors via at least one optical switching unit disposed between an output of the pumping unit at least one laser source or pump source and an input of an amplifier of the MOPA of each of the at least two HEL effectors.

3. A weapons system comprising:
at least two HEL effectors, each of the at least two HEL effectors comprising at least one beam guidance system; and
at least one laser source or pump source that is jointly useable for the at least two HEL effectors,
wherein each of the at least two HEL effectors comprise an amplifier, wherein the at least one laser source or pump source is connected to the at least one beam guidance system of each of the at least two HEL effectors via at least one optical switching unit disposed between an output of the at least one laser source or pump source and a first input of the amplifier of each of the at least two HEL effectors, and the weapons system further comprising at least one master oscillator that is connected to the at least one beam guidance system of each of the at least two HEL effectors via at least one additional optical switching unit disposed between an output of the master oscillator and a second input of the amplifier of each of the at least two HEL effectors.

4. The weapons system as claimed in claim 1, wherein the at least one optical switching unit is an optical switch or an optical switching point.

5. The weapons system as claimed in claim 4, wherein the at least one optical switching unit adjusts and/or vary varies a beam power of the at least one laser source or pump source of each of the at least two HEL effectors.

6. An object comprising a weapons system as claimed in claim 3, wherein the at least one laser source or pump source or the at least one master oscillator are disposed centrally or decentrally on or in the object in relation to the at least one beam guides guidance system of each of the at least two HEL effectors.

7. The object as claimed in claim 6, wherein the at least one beam guidance system of each of the at least two HEL effectors are mounted on platforms.

8. The object as claimed in claim 6, wherein the the object is a stationary type, including a house, bunker or container, or the object is a movable type, including a vehicle on land, in the air or at sea.

* * * * *